United States Patent [19]

Berenguer et al.

[11] Patent Number: 5,766,269
[45] Date of Patent: Jun. 16, 1998

[54] CATIONIC DYES, THEIR PRODUCTION AND USE

[75] Inventors: Jordi Berenguer, El Prat de Llobregat; Manuel Jose Domingo, Barcelona; Jose Rocas, Reutlingen, all of Spain

[73] Assignee: Clariant Finance (BVI) Limited, Tortola, Virgin Islands (Br.)

[21] Appl. No.: 613,569

[22] Filed: Mar. 11, 1996

[30] Foreign Application Priority Data

Mar. 10, 1995 [ES] Spain .................... 9504888.0

[51] Int. Cl.$^6$ .................................................. D06P 1/30
[52] U.S. Cl. ..................... 8/652; 8/436; 8/919; 8/606
[58] Field of Search .................... 8/637.1, 652, 606, 8/436, 919

[56] References Cited

U.S. PATENT DOCUMENTS

| | | | |
|---|---|---|---|
| 4,801,303 | 1/1989 | Carlough et al. ................ | 8/652 |
| 4,941,923 | 7/1990 | Sotogoshi et al. ............... | 106/409 |
| 5,300,148 | 4/1994 | Domingo et al. ................ | 106/498 |

FOREIGN PATENT DOCUMENTS

| | | | |
|---|---|---|---|
| 1268585 | 5/1968 | Germany. | |
| 61549 | 5/1968 | Germany. | |
| 462989 | 11/1968 | Switzerland ................ | C09B 1/00 |
| 463666 | 11/1968 | Switzerland ................ | C09B 1/16 |

OTHER PUBLICATIONS

Schreiner, "Post-Alkylation of Sulfur Dyes in the Continuous dyeing process," Textiltechnik 25 (1), pp. 47–57 (1975).

"The Modification of Sulphur Dyes". Part II, H. Rath and W. Wagner, *Palette*, (ed. Sandoz AG) (1959), vol. 2, pp. 23–27.

*Primary Examiner*—Margaret Einsmann
*Attorney, Agent, or Firm*—Thomas C. Doyle

[57] ABSTRACT

A cationic dye ($S_K$) comprising at least one quaternary ammonium group or protonated or protonizable tertiary amino group and at least one chromophoric radical, wherein the chromophoric radical is the radical of an optionally (pre)reduced sulphur dye, its precursor ($S_{K1}$) containing a cationic group which is a secondary amino group of basic character, which is optionally protonated but does not contain an acid group in a substituent of this cationic group, or a mixture thereof and desolubilized derivatives thereof or of their non-quaternized and non-tertiary precursors, which in standardized form are usable as pigments.

33 Claims, No Drawings

CATIONIC DYES, THEIR PRODUCTION AND USE

It has been found that by introducing defined cationic groups into a reactive form of sulphur dyes, as defined below, there are obtainable cationic dyes of valuable properties.

The invention relates to the defined cationic dyes, their production and their use.

The invention thus provides a cationic dye ($S_K$) comprising at least one group (G) which is a quaternary ammonium group or a protonizable or protonated tertiary amino group and at least one chromophoric radical (D), wherein the chromophoric radical (D) is the radical of an optionally (pre)reduced sulphur dye, or a mixture thereof.

The dyes ($S_K$) of the invention may be synthesized by reacting (A) at least one reactive optionally (pre)reduced sulphur dye, i.e. an optionally (pre)reduced sulphur dye that contains an —OH, —NH$_2$ and/or —SH-group, optionally in alkali metal salt form, with (B) at least one reactant comprising at least one amino group of basic character or ammonium group linked to a bridging member, which bridging member is further linked to a reactive substituent or contains a reactive group that is capable of reacting with the respective hydroxy, amino or thiol group of (A), so as to link the bridging member covalently to the structure of (A), and optionally with (C) at least one reactant that does not contain any ammonium group or amino group of basic character, but which contains a reactive substituent or a reactive group that is capable of reacting with the respective hydroxy, amino or thiol group of (A), so as to link the respective radical of (C) covalently to the structure of (A), and, if required, alkylating any primary or secondary amino group introduced with (B) and/or quaternizing a tertiary amino group.

As a cationic dye ($S_K$) there is thus meant a dye that comprises at least one group (G) which is linked to a bridging member and which bridging member is linked to the chromophoric radical (D) by means of —S—, —O— or nitrogen (in particular —NH—).

As sulphur dyes come, in general, into consideration conventional dyes known under this concept and as defined as "Sulphur Dyes" and "Sulphurized Vat Dyes" in VENKATARAMAN "The Chemistry of Synthetic Dyes" Vol. II (Chapters XXXV and XXXVI) (1952) and Vol. VII (1974) or as defined e.g. in the "Colour Index" as "Sulphur Dyes" and also as "Vat Dyes" with the further indication "sulphur" and/or with a structure number and a synthetic method involving a sulphurization, e.g. as indicated in VENKATARAMAN as sulphurized vat dyes. Essentially they are dyes that contain aromatically bound oligosulphide bridges that are reducible to thiol groups and may optionally be of oligomeric to polymeric structure. They are obtainable mainly by thionation of the respective intermediates at high temperature, e.g. above 100° C., in particular in the temperature range of 110°–300° C. (e.g. by baking or in the melt or in the presence of water and/or of an inert organic solvent).

Among the sulphurized vat dyes are in particular meant those with typical sulphur dye character, i.e. containing oligosulphide bridges and preferably not containing conjugated pairs of carbonyl groups.

A preferred kind of sulphurized vat dyes is represented by those of the carbazole-group-containing indophenol series.

The exact structure of sulphur dyes is mostly unknown or not completely known, even if the starting compounds are known, since e.g. the number and/or position of the oligosulphide bridges, the number of sulphur atoms in one oligosulphide bridge, the number of hetero-rings and/or of NH-bridges, of any hydroxy groups and/or of any primary amino groups and further also the number of repeating monomeric units and their arrangement in the sulphur dye molecule may vary depending on the starting materials and synthetic conditions.

According to the invention there may be used as starting dye (A) a sulphur dye in reduced form (leuco sulphur dye) or in partially reduced form, i.e. such a reduced or partially reduced sulphur dye that has own colour and displays a sufficient number of thiol groups and optionally hydroxy groups and/or primary amino groups, in order to be soluble in the form of alkali metal thiolate (lithium, sodium or potassium thiolate, preferably sodium thiolate). For the purpose of the invention, it is also possible to use as (A) a non-reduced sulphur dye that contains a sufficiently high number of hydroxy and/or amino groups capable of reacting with (B) and which may be solubilized in the presence of alkali, in particular of sodium hydroxide.

If desired, the dye may be subjected to a purification treatment, e.g. by reducing and reoxidizing, if desired, with filtration and/or dialysis, e.g. as described in WO-A-93/07221 or in GB-A-2 228 490.

As (A) there may, in particular, be employed the (pre) reduced form of any sulphur dyes known to be reducible to the corresponding leuco sulphur dyes, e.g. of sulphur dyes known to lead to the following leuco sulphur dyes [Colour Index Leuco Sulphur denomination or Colour Index Reduced Vat (sulphur) denomination]:

C.I. Leuco Sulphur Black 1, CAS: 66241-11-0
C.I. Leuco Sulphur Black 2, CAS: 101357-26-0
C.I. Leuco Sulphur Black 11, CAS: 90480-94-7
C.I. Leuco Sulphur Black 18, CAS: 90170-71-1
C.I. Leuco Sulphur Red 10, CAS: 1326-96-1
C.I. Leuco Sulphur Red 14, CAS: 68585-53-5
C.I. Leuco Sulphur Blue 3, CAS: 85566-77-4
C.I. Leuco Sulphur Blue 7, CAS: 69900-21-6
C.I. Leuco Sulphur Blue 11, CAS: 90480-94-7
C.I. Leuco Sulphur Blue 13, CAS: 12262-26-9
C.I. Leuco Sulphur Blue 15, CAS: 100208-97-7
C.I. Leuco Sulphur Blue 20, CAS: 85940-25-6
C.I. Reduced Vat Blue 43, CAS: 1327-79-3
C.I. Leuco Sulphur Green 2, CAS: 12262-32-7
C.I. Leuco Sulphur Green 16, CAS: 70892-38-5
C.I. Leuco Sulphur Green 35, CAS: 90170-23-3
C.I. Leuco Sulphur Green 36, CAS: 90295-17-3
C.I. Leuco Sulphur Brown 1, CAS: 1326-37-0
C.I. Leuco Sulphur Brown 3, CAS: 100208-66-0
C.I. Leuco Sulphur Brown 10, CAS: 12262-27-0
C.I. Leuco Sulphur Brown 21, CAS: 97467-78-2
C.I. Leuco Sulphur Brown 26, CAS: 71838-68-1
C.I. Leuco Sulphur Brown 31, CAS: 1327-11-3
C.I. Leuco Sulphur Brown 37, CAS: 70892-34-1
C.I. Leuco Sulphur Brown 52, CAS: 68511-02-4
C.I. Leuco Sulphur Brown 95, CAS: 90268-97-6
C.I. Leuco Sulphur Brown 96, CAS: 85736-99-8
C.I. Leuco Sulphur Orange 1, CAS: 1326-49-4
C.I. Leuco Sulphur Yellow 9, CAS: 85737-01-5
C.I. Leuco Sulphur Yellow 22, CAS: 90268-98-7, or also the corresponding non-reduced or non-leuco dyes.

For the purpose of the invention it is of particular advantage that the dye (A), in particular in the (pre)reduced form, be substantially free of disturbing sulphide. Such (pre)reduced forms of sulphur dyes with a very low inorganic sulphide content or that are substantially free of a disturbing amount of inorganic sulphide are known in the art e.g. from the published patent applications GB-A-2 201 165 (liquid formulations of reduced sulphur dyes) and GB-A-2 255 981 and 2 273 103 (dry reduced sulphur dyes).

Where the starting dye is in non-reduced or partially reduced form, it may be employed in the form of available commercial dyes or directly as obtained from the thionation synthesis, e.g. by baking or boiling or in the melt, or also as obtained by re-oxidation of a reduced form, or also in the form of a dry dye or slurry, as described e.g. in WO-A-93/07221 or in GB-A-2 228 490. The thionation mixture may e.g. be precipitated from its aqueous alkaline mixture in conventional way, e.g. by oxidation or acidification, and filtered and the filter cake may be taken up in concentrated NaOH solution. The obtained solution may then (directly or upon previous reduction) be reacted with (B) and optionally (C).

Where it is desired to purify the starting dye (A) from any disturbing sulphide or sulphur, this may e.g. be accomplished by oxidizing until the disturbing sulphur or/and sulphide is oxidized in the presence of NaOH to a water soluble sodium salt form, mainly sodium sulphate; the non-soluble oxidized form of the dye may be separated from the inorganic dissolved salts by filtration, and then, if desired, be re-reduced to a (pre)reduced form.

If the starting dye (A) is in non-reduced form a reducing carbonyl compound—in particular containing an activating substituent such as hydroxy or methoxy in α-position, e.g. a reducing sugar or hydroxy-acetone—may be added in the presence of sodium hydroxide in concomitance with (B) and/or (C), e.g. directly before, at least in part simultaneously with or in a stepwise reaction sequence with one or more reactants (B) and/or (C).

The starting optionally (pre)reduced sulphur dyes (A) may be represented by the following general formula

in which

X signifies —O—, —S— or —NH—,

D is the q-valent chromophoric radical of the dye and q signifies a figure from 1 to the maximum functionality of the optionally (pre)reduced sulphur dye of formula (I), expressed by the formula

wherein each of x1, x2 and x3 is a figure $\geq 0$, with the proviso that the sum (x1+x2+x3) is a figure in the range from 1 to the total of the —OH, —SH and —NH$_2$ groups in the optionally (pre)reduced sulphur dye, i.e. in formula (I) q is a figure in the range of from 1 to (x1+x2+x3), and which are shown in the above formula in the free acid form but are preferably employed in the alkali metal salt form.

Depending on the method of production of the dye, some of the x1 groups —SH may also be linked to D$_1$ over a bridge of one or more (e.g. 1 to 6) sulphur atoms.

It is also possible to employ Bunte salts, i.e. compounds of formula (I') in which, where x1$\geq$1, at least some of the x1 groups —SH are replaced by a group —S—SO$_3$H, resp. a salt thereof.

If x1 is 0, formula (I') represents the non-reduced form of a sulphur dye that contains a sufficient amount of amino and optionally hydroxy groups as is sufficient for the dye to be soluble in weakly acidic to weakly alkaline aqueous solution, in particular of a pH in the range of 4 to 8. In this case the sum (x2+x3) is preferably at least 2, more preferably x2$\geq$2, e.g. x2+x3$\geq$4.

If x1$\geq$1 formula (I') represents a (pre)reduced sulphur dye, that is soluble in aqueous concentrated sodium hydroxide, in particular in a 0.01N to 10N sodium hydroxide solution, preferably in a 0.1N to 8N sodium hydroxide solution.

Preferably formula (I) respectively (I') represents a (pre)reduced sulphur dye in which x1 is at least 1, e.g. a number in the range of from 1 up to 1.5 times the number of benzenic rings in the molecule, preferably in the range of 2 to 1.3 times the number of benzenic rings in the molecule. The sum (x1+x2) is, in this case, preferably $\geq$3, more preferably $\geq$4.

Depending on the degree of reduction of the sulphur dye to a (pre)reduced leuco form, this may be in a mono- or oligomeric form, preferably in an oligomeric form, i.e. a form containing two or more of the radicals derived from the original aromatic starting material.

By way of example there may be mentioned a leuco form of C.I. Sulphur Black 1 that contains four benzenic rings and, depending on its synthetic method and degree of reduction, may contain 2 to 6 thiol groups, and a leuco form of C.I. Sulphur Brown 10 that contains 4 to 8 benzenic rings and, depending on its synthetic method and degree of reduction, may contain 1 to 9 thiol groups.

Taking as a reference one of the formulae indicated in volume 2 of VENKATARAMAN (cited above), i.e. the one indicated at page 1090 as formula IV, which contains four benzenic rings derived from the reduced form of the original sodium dinitrophenate, the reduced form of C.I. Sulphur Black 1 derived therefrom will contain four thiol groups, two primary amino groups, four secondary amino groups and two hydroxy groups as corresponding to the following formula

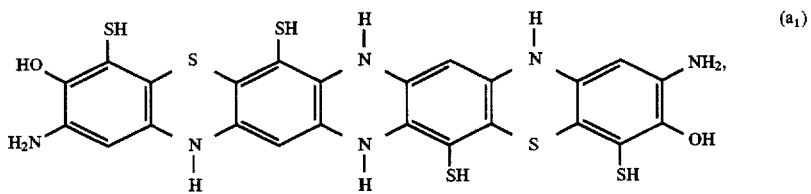

in which in the presence of sodium hydroxide the thiol groups will be in sodium thiolate form.

Analogously, the reduced fully thiolated form of C.I. Sulphur Brown 10 or C.I. Sulphur Orange 1 corresponding to the oligomeric derivative of 2,4-diaminotoluene, may be represented by the presumed general oligomeric formula

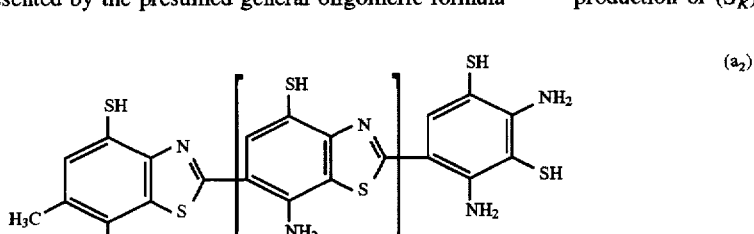

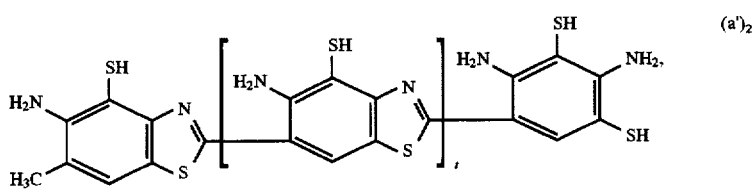

wherein t signifies e.g. 2 to 6 (mostly 4 to 6) and in which, in the presence of sodium hydroxide, the thiol group will be in sodium thiolate form.

Where in formula (I') x1≠0, the reactivity of the substituent —SH at pH≧11 (in particular at pH 14), i.e. in the thiolate form, of the starting dye (A) of formula (I) towards the alkylating agents is in general considered to be higher than the one of any hydroxy or amino groups —XH and of any secondary or tertiary amino groups present in the molecule (A).

As cationic dye ($S_K$) or mixture thereof there is meant any such dye or mixture as defined above, obtainable by cationizing reaction of (A) with (B) and optionally (C), and optional further alkylation and/or quaternization, as required. As cationic group (G) introduced by the stated reactions there is meant either an ammonium group (quaternary ammonium group or protonated tertiary amino group) or a protonizable basic tertiary amino group in which the nitrogen atom is linked only to aliphatic carbon atoms.

The reactants (B) are in general compounds suitable for introducing at least one quaternary ammonium group and/or at least one tertiary amino group linked to the bridging member in a one-step or multistep reaction. Suitable compounds (B) are Z-containing alkylating agents, which may e.g. be represented by the following formula

W—Y—Z          (II), in which
W signifies a reactive substituent,
Y signifies a bridging member
and
Z signifies a primary, secondary or tertiary amino group of basic character or its protonated derivative or a quaternary ammonium group or an optionally quaternized oligoamine radical.

If in (B), in particular in formula (II), Z signifies a primary or secondary amino group of basic character or contains such a group, after the reaction of (B) with (A), for the production of ($S_K$) it is further alkylated to the tertiary or quaternary stage. If in (B) Z is or contains a tertiary amino group of basic character it may further be alkylated to the quaternary stage, if desired.

W may be any suitable leaving group or atom, in particular alkylsulphate (e.g. etho- or methosulphate), arylsulphate (e.g. tosylate), trifluoroacetate, halogen (e.g. bromide, iodide or preferably chloride), or, where Z is tertiary or quaternary, together with a substituent or bond of Y also an epoxide group; preferably W signifies halogen, more preferably chlorine.

Y signifies an aliphatic or araliphatic bridging group, in particular a hydrocarbon group that may optionally contain one or more hetero atoms and/or may be substituted. Preferably Y is aliphatic and advantageously contains 2 to 9, preferably 2 to 6 carbon atoms. If it contains 3 or more carbon atoms, it may optionally be branched. If it contains 6 to 9 carbon atoms, it may optionally be cyclic. The substituents W and Z are preferably at a distance of at least 2 carbon atoms from each other, more preferably at least 3 carbon atoms. If Y is substituted it contains a substituent that preferably does not interfere with the reaction, e.g. an aliphatically bonded secondary hydroxy group or a methoxy group. Most preferably Y is ethylene-1,2 or 2-hydroxypropylene-1,3.

Z may be or contain a primary, secondary or tertiary amino group or a quaternary ammonium group, in particular Z is one of the following groups

| | |
|---|---|
| —$NH_2$, | ($z_1$) |
| —$NHR_1$ | ($z_2$) |
| —$NR_1R_2$ | ($z_3$) |

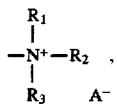

in which

R$_1$ signifies C$_{1-4}$-alkyl, —(C$_{1-4}$-alkylene)—Q—OM, —(C$_{1-4}$-alkylene)—Q—NH$_2$, benzyl or sulphobenzyl, R$_2$ signifies C$_{1-4}$-alkyl or phenyl optionally substituted with a non-protogenic donor (e.g. methyl or methoxy), or R$_1$ and R$_2$ together with the nitrogen to which they are linked form a heterocyclic ring, R$_3$ signifies C$_{1-4}$-alkyl, Q signifies —CO— or —SO$_2$—, M signifies hydrogen or a cation or in formula (Z$_4$) R$_1$, R$_2$ and R$_3$ together with the nitrogen atom to which they are linked, form a pyridinium group, and A$^-$ signifies a counterion to the ammonium cation.

Among the substituents of aliphatic character and those of aromatic or araliphatic character, those of aliphatic character are preferred.

Among the C$_{1-4}$-alkyl radicals the lower molecular ones are preferred, in particular ethyl and most preferably methyl.

Among the C$_{1-4}$-alkylene groups in the sulpho-alkyl and sulphamoyl-alkyl groups are preferred ethylene, propylene and butylene.

Among the C$_{1-4}$-alkylene groups in the carboxy-alkyl and carbamoyl-alkyl groups are preferred methylene and ethylene.

Where R$_1$ and R$_2$ together with the nitrogen to which they are linked form a heterocyclic ring, this is preferably an aliphatic, saturated ring, in particular a pyrrolidine, piperidine, morpholine or N-methylpiperazine ring.

The counterion A$^-$ is preferably halide, most preferably chloride.

Particularly preferred compounds of formula (II) correspond to the following formulae

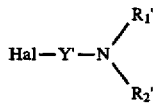

and

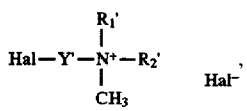

in which Y' signifies ethylene-1,2 or preferably 2-hydroxypropylene-1,3,

R$_1$' signifies methyl, ethyl, benzyl or —CH$_2$—CO—NH$_2$,

R$_2$' signifies methyl or ethyl, and

Hal signifies halogen, preferably chlorine.

In formula (II") R$_2$' preferably signifies methyl and R$_1$' preferably signifies —CH$_2$—CO—NH$_2$ or methyl, most preferably methyl.

Q preferably signifies —CO—.

Where M signifies a cation this is preferably an alkali metal cation.

As Z-containing alkylating agents (B) there may also be employed ethylenically unsaturated compounds, in particular allylic compounds, e.g. such as N,N-dimethyl-N-allylamine and N,N,N-trimethyl-N-allylammonium chloride or methosulphate. If desired there may also be employed bifunctional alkylating agents, e.g. of the formula

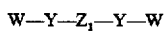

in which

Z$_1$ signifies a bivalent radical which is a quaternary ammonium group or a secondary or tertiary amino group or is an oligoamine radical in which the amino groups are secondary, tertiary or/and quaternized, or diallylamines or diepoxides in which the amino group is secondary or preferably tertiary or quaternized.

Examples of bifunctional alkylating agents are N-methyl-N,N-diallylamine, N,N-dimethyl-N,N-di-allylammonium chloride, N,N-di-(3-chloro-2-hydroxypropyl-1)-N,N-dimethylammonium chloride, N,N-di-(2,3-epoxypropyl-1)-N,N-dimethylammonium chloride, N,N'-di-(3-chloro-2-hydroxypropyl-1)-N,N'-dimethylpiperaz-diinium dichloride, N,N'-di-(2,3-epoxypropyl-1)-N,N'-dimethylpiperazdiinium dichloride. These may either react with two reactive groups —XH (preferably —SH resp. —S$^-$) of one same molecule to form a ring, or of two molecules to form a bridge, or a substituent W that has not reacted with —XH may—in particular when containing an activating substituent in βposition—be hydrolyzed.

Where Z or Z$_1$ signifies a group that contains a substituent —Q—OM, the reactants (B) are preferably chosen so that the number of groups —Q—OM that are present in total on average in the molecule of (S$_K$) is preferably inferior to the total average number of introduced cationic groups. Preferably the number of groups —Q—OM is ≦35%, more preferably ≦15% of the total introduced cationic groups. Most preferably (S$_K$) does not contain any groups —Q—OM (or their inner salts).

The groups —Q—OM may—depending also on the pH—be present also in the form of inner salt with an ammonium group of the molecule, e.g. of the same chain, e.g. as

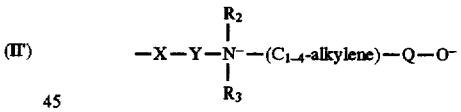

or

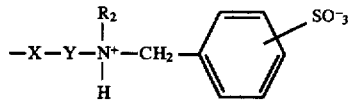

or also with an amino group or ammonium group of another chain of the same molecule.

The reaction of the optionally (pre)reduced sulphur dye (A) with the reactant (B) may be carried out in alkaline, neutral or even weakly acidic medium, depending on the reactive groups. The reaction of (B) with thiol groups of (A) is suitably carried out in alkaline medium, preferably in an alkaline solution of (A), the pH of which is preferably above 10, advantageously in which the alkalinity corresponds to a sodium hydroxide solution of at least 0.0001 normality, e.g. 0.0001 to 10N. Under these alkaline conditions, preferably at pH>12, any thiosulphonate or (oligo)thiosulphide groups may be split to thiolate —S$^-$ and optionally other by-products (e.g. sulphur, thiosulphate etc. as resulting from the employed particular reaction mixture and reaction conditions), oligosulphide bridges may occasionally also be split. During the reaction the pH is preferably allowed to drop to values below 10, e.g. in the range of 4 to 10. The reaction of a primary amino group of (A) with (B) is preferably carried out under acidic to weakly alkaline pH conditions, preferably at a pH below 10, e.g. at a pH in the range of 4 to 8, preferably 4.5 to 7; where Z is or contains a primary, secondary or tertiary amino group, resp. where $Z_1$ contains a secondary or tertiary amino group, the pH is suitably chosen below the pK of this amino group of (B). The reaction temperature may vary with (A) and with (B), e.g. up to the boil, and is preferably in the range of 0° to 70° C. Where (A) is a (pre)reduced sulphur dye and the compound (B), in particular of formula (II) or (III), is an aliphatic halide, the reaction may even be exothermic and can then expediently be carried out with cooling. The reaction of —SH is preferably carried out under such conditions that the pH is alkaline during the reaction. The reaction of non-(pre)reduced dyes (A) with (B) is preferably carried out with heating, at a temperature which is preferably in the range of 40° C. to reflux. If desired, a reducing carbonyl compound, e.g. a reducing sugar, may be added before or during the reaction, in order to simultaneously reduce the sulphur dye to an at least partially reduced form with reactive thiol groups. When the cationizing reaction has reached the desired degree the pH may suitably be lowered to acidic values, preferably in the range of from 5 to 2, more preferably 4 to 2.5, in order to complete, interrupt or stop the reaction and/or to stabilize the reaction product.

Where the group $Z_1$ is a tertiary amino group, by the above acid addition it is obtained in the protonated ammonium salt form.

In the above reaction it is of advantage that all of the thiol groups available in the dye or dye mixture (A) be reacted and thus the compounds (B), in particular of formula (II) and/or (III), and optionally (C)—if employed—are preferably employed in excess over the stoichiometric amount required for reacting with the thiol groups, in particular more than x1 moles of compound(s) of formula (II), respectively $\geq 50\%$ of x1 moles of bifunctional compound of formula (III), per mole of compound of formula (I'), so that at least some of the available x2 primary amino groups of (A) are also reacted with (B) and optionally with (C), e.g. 5 to 100%, preferably 5 to 70% of the available x2 primary amino groups of (A).

If in (B) Z is a primary or secondary amino group, this is preferably alkylated or even quaternized after the above reaction, using a suitable alkylating agent, e.g. chloracetamide, benzylchloride or a $C_{1-4}$-alkylhalide, preferably chloride, or—especially for quaternization—a dialkylsulphate, e.g. dimethylsulphate or diethylsulphate.

Most preferably Z in the compounds of formula (II)— resp. $Z_1$ in formula (III)—is a tertiary amino group or a quaternary ammonium group and no alkylation or quaternization of Z or $Z_1$ is carried out after the reaction of (A) with (B).

The amount of groups —XH, in particular of groups —SH, may be assessed by reactions conventional per se, e.g. by stepwise alkylation reaction with simultaneous determination of the solubility of the product and of the variations of the visible spectrum—in particular of ε—of the reaction mixture, at pH values as suitable for the respective reaction; as titration value there is taken the one at which no more variation of the solubility of the product and of the visible spectrum of the reaction mixture takes place.

By using an excess of alkylating agent (B) also at least a part of the available amino groups—if any —of (A), in particular of the x2 amino groups in formula (I'), may be reacted with (B). In this way a relatively high quantity of cationic groups, i.e. amino groups of basic character and/or ammonium groups is introduced into the dye molecule. Where such a high concentration of positive charges and/or protonatable amino groups is not desired in the dye, it may be of advantage to react, i.e. to engage, a part of the groups —XH with another non-cationic substituent, in particular by reacting with (C) which expediently is an akylating or arylating agent that does not contain any substituent of the kind of Z or $Z_1$, but is suitable in particular for introducing a preferably non-ionic substituent R e.g. of formula

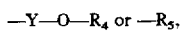

wherein $R_4$ signifies $C_{1-4}$-alkyl, —($C_{1-4}$-alkylene)—Q— $NH_2$, benzyl or -phenyl—$SO_2NH_2$ and $R_5$ signifies $C_{1-4}$-alkyl, benzyl or —($C_{1-4}$-alkylene)—Q—$NH_2$, in particular compounds of formula $$W—Y—O—R_4 \qquad (IV)$$

or $$W—R_5 \qquad (V).$$

As non-Z-containing alkylating or arylating agents (C) that may be used in this regard, there are meant in particular reactants that are suitable for introducing non-ionic substituents; mainly come into consideration reactants suitable for the introduction of $C_{1-4}$-alkyl, preferably methyl or ethyl, e.g. $C_{1-4}$-alkylhalides, preferably chlorides, or benzyl chloride, or also chloracetamide or chloropropionic acid amide, which are suitable for the introduction of a carbamoylmethyl group or a carbamoylethyl group, or the diazonium compound of aminobenzenesulphonamides. Preferably R is a non-ionic hydrophilizing substituent, in particular containing a group —Q—$NH_2$. This reaction may also take place in the same reaction medium, before or simultaneously with the reaction with (B). Preferably the reaction is carried out in such a way that the final dye contains at least one group —Y—Z', where Z' signifies an optionally protonated group of formula ($z_3$) and/or a group of formula ($z_4$), more preferably so that at least 30% of the available reactive groups are reacted with (B).

The cationic dyes of the invention may thus be represented by the following average formula $$[R—X_1\underset{m}{\vdash}—D\dashv X_1—Y—Z_2]_{(q-m)}, \qquad (VI)$$

wherein R is a non-ionogenic radical, preferably $C_{1-4}$-alkyl, benzyl or —($C_{1-2}$-alkylene)—$CONH_2$, $X_1$ signifies —S—, —O—, —NH—,

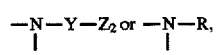

$Z_2$ signifies a tertiary amino group of basic character which may be protonated or a quaternary ammonium group, D signifies the q-valent chromophoric radical of the optionally (pre)reduced sulphur dye of the formula (I) and m is a figure in the range from 0 to (q-1).

Where no reactant (C) has been involved, the respective cationic dyes ($S_K$) of the invention may also be represented e.g. by the following average formula $$D\!+\!X_2\!-\!Y\!-\!Z_2)_q, \tag{VI}$$

wherein $X_2$ signifies —O—, —S—, —NH— or $$-\underset{|}{N}-Y-Z_2.$$

Preferably Z2 signifies an optionally protonated group of formula ($z_3$) or a group of formula ($z_4$). If the molecule contains more than one group $Z_2$ and/or more than one bridge Y and/or more than one $X_1$ or $X_2$ and/or more than one —R, the groups —$Z_2$ and/or the various groups —Y— and/or the various groups or atoms —$X_1$— or —$X_2$— and/or the various groups —$X_1$—Y— or —$X_2$—Y— and/or the various groups —Y— $Z_2$ and/or the various groups —$X_1$—Y—$Z_2$ or —$X_2$—Y—$Z_2$ respectively may each have between them the same significance or different significances.

The obtained dyes may be employed in the form of aqueous compositions, as synthesized and optionally purified, e.g. by membrane filtration, e.g. microfiltration suitably through membranes with a pore size in the range of 0.02 to 15 μm, and/or ultrafiltration e.g. through membranes with pore sizes suitably in the range of 0.2 to 20 nm (on the large scale membrane filtration may also be replaced by filtration through corresponding capillaries or hollow fibres giving the same cut-off as the respective membrane) and/or may be isolated from the reaction mixture by precipitation or crystallization from a solvent in which the impurities and by-products are soluble, but in which the cationic dye is not soluble. A preferred solvent is ethanol. When using membrane filtration a pore size >1 μm, advantageously in the range of 10 to 15 μm, preferably 10 to 12 μm, is preferred for microfiltration for obtaining a purified dye solution as the permeate, whereas a smaller pore size, in particular giving a cut-off, referred to polyethylenegycols, in the range of molecular weight 2000 to 20000, advantageously 3000 to 15000, (e.g. as commercially available under the designation G20, G50 or G80) is preferred for purifying the dye solution from mineral salts, the purified dye remaining in the retentate. If desired the dialyzed dye solution may be dried, e.g. spray dried.

For the elimination of any disturbing free sulphur or inorganic sulphur compounds such as sulphide or sulphite, the aqueous reaction product may be subjected to oxidation, e.g. with $H_2O_2$, air, oxygen or air enriched with oxygen, in order to oxidize inorganic sulphur compound or the sulphur in the presence of NaOH to sodium sulphate, which may then be eliminated by membrane filtration. The oxidation may even be carried out under more acidic conditions, e.g. at a pH in the range of 3 to 7, suitably below the pK of the amine, and with heating, e.g. at 40° to 70° C.

A filtering earth may also be employed if desired.

The starting compounds (B) are known or may be synthetized analogously to known methods. The preferred compounds of formula (II) and (II"), in which $Y_1$ signifies 2-hydroxy-propylene-1,3 may e.g. be synthetized by reaction of epihalohydrin with the respective amine of formula $$HNR_1'R_2' \tag{VII}$$

optionally in protonated form, preferably protonated with a hydrohalogenic acid, especially with hydrochloric acid, or with an ammonium salt of formula $$\begin{array}{c} R_1 \\ | \\ R_2\!-\!N^+\!-\!H \quad Hal^-. \\ | \\ CH_3 \end{array} \tag{VIII}$$

This reaction may be carried out in aqueous solution where it takes place spontaneously and is exothermic. Preferably the reaction temperature is kept at values <50° C.

A particular feature of the invention is represented by those cationic reaction products ($S_{K1}$) of (A) with (B) and optionally (C), in which (B) contains a secondary amino group, in particular of formula (z2), that does not contain any anionic substituent, in particular no substituent —Q—OM. These products may, even without further alkylation resp. quaternization of the secondary amino group, also be employed as cationic dyes.

The dyes of the invention may be employed, analogously to any known cationic dye, for the dyeing of substrates dyeable with cationic dyes, in particular fibrous substrates, mainly acid-modified synthetic fibres (e.g. polypropylene, polyamide, polyurethane), acrylic fibres, cellulosic fibres, wool, silk or leather, or also of anodized aluminium. The fibres may be in any form as suitable for the dyeing with cationic dyes. Textile fibres may be e.g. in the form of loose fibres, filaments, yarns, weavings, knittings, non-woven fibre-webs or felt. Synthetic fibres may also be dyed in the mass. Cellulosic fibres may be textile fibres (mainly cotton and blends of cotton and synthetic fibres, e.g. CO/AC) or also paper. The dyes of the invention are particularly suitable for the dyeing of tanned leather, preferably of retanned leather.

Any kind of tanned leather commonly used as a substrate for dyeing from aqueous medium may be used as a substrate, particularly grain leather, suede leather, split velours, buckskin and nubuk-leather, further also wool-bearing skins and furs. The leather may have been tanned by any usual tanning method, in particular vegetable, mineral, synthetic or combined tanned (e.g. chrome-tanned, zirconyl-tanned, aluminium-tanned or semi-chrome tanned). Preferably the leather is also retanned and/or fatted; for retanning there may be used any retanning agent conventionally employed for retanning, e.g. vegetable or synthetic tanning agents and optionally also mineral tanning agents. Preferably mineral tanned leather, in particular chrome tanned leather, is retanned with up to 25% by weight of a synthetic and/or vegetable retanning agent. Before dyeing the leather may also be fatted (in particular fat-liquored) and for this purpose any conventional anionic, cationic, non-ionic or combined fatting agents may be employed, in particular such as are commonly applied from aqueous media, e.g. animal, vegetable or mineral fats, oils, resins or waxes and their chemical modification products, e.g. hydrogenation, oxidation, saponification or sulphonation products of animal or vegetable fats and oils, or chlorination and/or sulphonation products of mineral fats or oils, and synthetic fatting agents, e.g. esters of polybasic acids, in particular phosphoric acid with optionally oxyethylated fatty alcohols. By the term sulphonation is meant generally the introduction of a sulpho group including also the formation of a sulphato group and the introduction of a sulpho group by reaction with a sulphite or $SO_2$.

The leathers may be of various thicknesses; thus, there may be used very thin leathers such as book-binder's leather or glove leather (nappa), leather of medium thickness, such as shoe upper leather, garment leather and leather for handbags, or also thick leathers such as shoe-sole leather, furniture leather, leather for suitcases for belts and for sport articles; woolled skins and furs may also be used. After tanning the pH of the leather is advantageously set to values in the range of 4 to 8 (the leather is "neutralized"). Depending on the thickness of the leather and on the compactness of its fibrous structure, there may be chosen an optimum pH range, e.g. for grain leather and thick leathers pH-values in the range of 4 to 6, for suede leather, split velours and very thin leathers pH values in the range of 4.5 to 6.5, for intermediately dried suede leather and intermediately dried split velours the pH values may range in the scope of 5 to 6.5. Preferably the pH-range is kept at neutral to weakly acidic values, more preferably within the range of 4.5 to 6. For the adjustment of the pH-value of the leathers, there may be employed conventional assistants; for tanned leather of acidic character the pH may be adjusted by addition of suitable bases, e.g. ammonia or ammonium carbonate or alkali metal salts of weak acids, e.g. sodium formate, sodium acetate, sodium bicarbonate or sodium carbonate or buffer salts, e.g. mono- or di-alkali metal salts of polybasic acids, in particular of phosphoric acid. Preferably there is employed sodium formate. Sodium bicarbonate is preferably employed as a second base for the exact adjustment of the superficial pH-value of the leather. For retanning the pH is kept preferably in the range of 4 to 6.5. If desired, mineral tanned leather may also be masked, e.g. with alkali metal formate, oxalate of polyphosphate or e.g. with titanium/potassium oxalate.

A retanning agent, preferably of anionic character [e.g. acrylic acid (co)polymers, phenolic syntans, sulpho-group-containing polysulphones] may be employed for an after-treatment of the cationic dyeing, and preferably before a fatting.

The cationic dyes of the invention are also suitable for a multi-stage dyeing, where the dyeing is carried out in two or more stages and where in each stage there may be used the same dye or different dyes. Thus, the leather may e.g. be pre-dyed with a cationic dye $(S_K)$ or $(S_{K1})$ or an anionic dye and then dyed with a cationic dye $(S_K)$ or $(S_{K1})$ or may be pre-dyed with a cationic dye $(S_K)$ or $(S_{K1})$ and then dyed with an anionic dye, e.g. by the so-called "sandwich-dyeing".

Most preferably the dyes of the invention, when used for the dyeing of leather, are used for top-dyeing of retanned leather; for this purpose it is preferred that they contain per dye monomer unit at least one cationic group, preferably 1.2 to 1.6 cationic groups. With particular preference, for the dyeing of leather, the dye contains also a minor amount of non-ionic substituent R, which preferably is carbamoylmethyl.

The dyeing may be carried out under conventional temperature and pH conditions, advantageously in the temperature range of 10° to 70° C., preferably 25° to 70° C.; the pH-values are advantageously within the range of 2.5 to 4.5, preferably 3 to 4, and to complete the dyeing procedure, the pH of the dye bath is advantageously raised by base addition, preferably to values >4, more preferably ≧4.5, in particular in the range of 4 to 6, more preferably 4.5 to 5.5, for fixation. Any conventional bases may be used for this purpose, e.g. those mentioned above for "neutralization" of tanned leather, or sodium carbonate, preferably sodium carbonate or ammonium hydroxide, or also amines, e.g. fatty amines or their derivatives, as conventionally employed as leather softeners, or fixing agents for anionic dyeings. After the addition of the dye and optionally of any dyeing assistants and before any final addition of base, the treatment of the substrate in the dye bath is continued until the desired penetration is achieved. The optimum dyeing-duration for a given combination of substrate, dye, assistant and dyeing method may be assessed by a few preliminary tests and is e.g. within 15 and 120 minutes, mostly within 30 and 90 minutes.

Before any base addition the dyed substrates may, if desired, be fatted or fat-liquored. After conclusion of the dyeing procedure, including any fatting or fat-liquoring and any base addition, the substrate may be washed or rinsed and, after drying, finished as usual. If desired, the leather may be subjected to subsequent treatments, e.g. it may be hydrophobized or finished with a resilient polymer-coating or gloss-topping.

The dye concentration referred to the leather may vary broadly, depending on the substrate, the dyeing method and the desired colouristic effect, and may range, if desired, up to the saturation level of the substrates. The total amount of the dye is advantageously in the range of 0.02 to 4% by weight, based on the wet weight of the substrate (i.e. about 0.04 to 8%, based on the dry weight of the substrate).

The dyes of the invention are also suitable for the application on leather surface by methods conventional per se, e.g. by spraying, foam application, with an air knife or a curtain coater. For this purpose the dye is advantageously applied in the form of an aqueous dye solution that may contain additives as conventional for aqueous coating solutions, e.g a preferably non-ionic surfactant (e.g. as wetting agent or levelling agent) and preferably also a solubilizer for the sufactant such as a mono- or oligo-alkyleneglycol ether wherein alkylene preferably is ethylene, propylene or/and butylene, or a mono-$(C_{1-4}$-alkyl)-ether thereof; if desired or required, e.g. depending on the method of application, there may also be added a defoamer or a foaming agent.

Paper may be dyed in a manner conventional per se, in the stock or on the web, and may be bleached or preferably unbleached; if desired the paper may be sized with a conventional size such as e.g. rosin size, aluminium sulphate or starch, and/or be filled with a conventional mineral filler, such as kaolin or calcium carbonate or sulphate. Retention and/or dewatering auxiliaries, in particular acrylic (co)-polymers, preferably of non-ionic or weakly cationic character (e.g. with ≦20 mol %, preferably ≦10 mol % of cationic co-monomeric units, e.g. polyacrylamides) may be employed if desired. The pH is e.g. in the range of 4 to 8 and the temperature in the range of 5° to 70° C., preferably 10° to 60° C. in particular 10° to 40° C.

Textile fibres may be dyed by exhaust or impregnation methods. By exhaust methods the dyeing may be carried out at liquor-to-goods ratios conventional per se, e.g. in the range of 120:1 to 2:1, depending on the chosen apparatus and material, preferably with heating e.g. at temperatures in the range of 50° C. to the boil, preferably 60° to 98° C., or also above, e.g. 102° to 130° C., with superatmospheric pressure. The pH may range in a scope as conventional for cationic dyes, e.g. pH 4 to pH 8. As impregnation methods come into consideration e.g. padding and dipping followed by a thermal fixation above 100° C., e.g. by drying, steaming or thermosoling, optionally with intermediate pre-drying. Prints may also be fixed in this way.

The dye concentration may vary broadly, depending also on the substrate, the dye, the method and the desired colouristic effect.

By combining different cationic dyes $(S_K)$ or $(S_{K1})$, with each other or also cationic dyes $(S_K)$ or $(S_{K1})$ with other compatible cationic dyes there may be achieved various colouristic effects.

There may be obtained dyeings of various intensities, also of very intensive deep shade, and of outstanding fastnesses, e.g. lightfastness, wet fastnesses, fastness to dry cleaning, to dry or wet rubbing and to migration, and on leather there may in particular also be achieved dyeings of high colour intensity and notable resistance to PVC-migration. On mineral tanned leather (in particular non-retanned or only weakly retanned leather) there may be achieved a notable dye penetration; on retanned leathers there may be achieved particularly intensive dyeings. There may in particular be achieved also level dyeings.

The cationic dyes $(S_K)$ or $(S_{K1})$ of the invention as obtained by the described synthetic methods, in particular at a pH below 5, are very stable, in particular to storage and oxidation. Depending on the Kind and number of substituents they may be of various solubility. Where they are of a high solubility they may e.g. be diluted with water, even at ambient temperature, i.e. at 20° C. They may also be diluted with water to concentrated compositions, e.g. as suitable for handling or shipment (for instance with an active dye content in the range of 5 to 50%, preferably 8 to 40% by weight) or as stock solutions as required for many dyeing processes (e.g. with a concentration of active dye in the range of 0.5 to 10% by weight), the liquid compositions being preferably of an acidic pH, e.g. in the range of pH 2 to pH 5, preferably 2.5 to 3.5, as indicated above for the completion of the synthetic reaction. Dry dyes may be obtained by any suitable method, e.g. by precipitating with a solvent as indicated above, filtering and drying of the filter cake, or by spray drying of a dialyzed dye solution. If desired the dye may be blended with conventional blending agents, preferably non-ionic blending agents, e.g. dextrin. The dyeings that are obtainable with the dyes of the invention are characterized by a take-up and colouristic properties as cationic dyes and by a colour-yield and fastnesses of very high level. On leather of various affinities there are obtainable very regular dyeings of high colour-yield and notable penetration, especially where for the production of the cationic dye of the invention there has been used a starting dye (A) that is a mixture of various oligomers.

According to a particular further feature of the invention the above cationic dyes $(S_K)$ or $(S_{K1})$ or also a cationic reaction product $(S_{K2})$ of (A) with a reactant (B) that contains a primary amino group, in particular of formula (z1), and optionally (C), may be combined with an anionic desolubilizer $(D_A)$, in order to obtain a dye $(S_D)$ of reduced water-solubility, in particular a water insoluble dye, that— upon suitable standardization—may be employed, e.g. analogously to a pigment or disperse dye, for dyeing suitable substrates.

As $(D_A)$ come into consideration any anionic compounds capable of de-solubilizing a cationic dye $(S_K)$, $(S_{K1})$ or $(S_{K2})$, especially anionic surfactants, anionic syntans, anionic dyes and anionic optical brighteners.

The anionic surfactants to be employed as $(D_A)$ are e.g. carboxylic, phosphonic or sulphonic compounds, more particularly containing at least one lipophilic radical, which may be aliphatic, araliphatic or aromatic, preferably with 8–24 carbon atoms, e.g. fatty acids, alkane sulphonates, partial esters of polybasic acids (e.g. of phosphoric acid, sulphuric acid, phthalic acid, citric acid or succinic acid) with option ally oxyalkylated fatty alcohols (e.g. $C_{12-24}$-fatty alcohols, optionally oxyethylated with 1–10 moles of ethylene oxide), petroleum sulphonates, condensation products of a sulphonated (alkyl)napthalene or (alkyl)naphthalene mixture (e.g. unsubstituted naphthalene and/or mono- or di-methyl-, -ethyl-, -isopropyl-, or -butyl-naphthalene) and/or sulphonated benzenic or phenolic compounds (e.g. toluene, xylene, phenol, biphenyl, diphenylether, ditolylether or dihydroxydiphenylsulphone) with formaldehyde.

The anionic syntans to be employed as $(D_A)$ are e.g. those mentioned above as retanning agents.

The anionic dyes to be employed as $(D_A)$ may be any such dye, e.g. acid dye, direct dye, mordant dye, metal complex dye, solubilized sulphur dye, solubilized vat dye, (pre)reduced sulphur dye (i.e. leuco sulphur dye) or other anionic dye, or also a fibre-reactive dye [in this case a fibre-reactive substituent may also be reacted with any still available reactive hydroxy- or amino group of the dye $(S_K)$, $(S_{K1})$ or $(S_{K2})$, if desired]. The anionic dye may be of the same or similar shade as the dye $(S_K)$, $(S_{K1})$ or $(S_{K2})$, or may also be of a different shade, by which there may be obtained desolubilized dyes of corresponding combined shade.

As anionic optical brighteners to be employed as $(D_A)$ come into consideration mainly sulpho-group-containing brighteners, e.g. of the diaminostilbene series and of the pyrazoline series. By combination of $(S_K)$, or even of $(S_{K1})$ or $(S_{K2})$, with optical brighteners $(D_A)$ there may be achieved desolubilized dyes $(S_D)$ of notable brilliance.

The desolubilized dyes $(S_D)$ may be produced by plain admixing of the selected pairs of solutions of $(S_K)$, or even of $(S_{K1})$ or $(S_{K2})$, and of $(D_A)$, in the desired molar ratio, optionally with heating, advantageously to a temperature in the range of 30° C. to the boil. The molar ratio is preferably chosen so that substantial desolubilization is achieved and is preferably in the range of 50–100 equivalents of $(D_A)$ for every 100 equivalents of $(S_K)$, $(S_{K1})$ or $(S_{K2})$. In the case of anionic surfactants employed as $(D_A)$, an excess thereof may also be employed in order to favour any subsequent standardization, dispersability and/or wetting of $(S_D)$; there may e.g. be employed up to 200 equivalents of surfactant $(D_A)$ for every 100 equivalents of $(S_K)$, $(S_{K1})$ or $(S_{K2})$.

As one equivalent of $(D_A)$ there is meant here 1 mole of $(D_A)$ divided by the number of its anionic groups.

As one equivalent of $(S_K)$, $(S_{K1})$ or $(S_{K2})$ there is meant here one mole of $(S_K)$, $(S_{K1})$ or $(S_{K2})$ divided by the number of cationic groups introduced by the reaction with (B) minus the number of any anionic substituents in any of the groups Z, $Z_1$ or R. For the purpose of de-solubilization there are preferably employed cationic dyes $(S_K)$, $(S_{K1})$ or $(S_{K2})$ that do not contain any anionic substituents in Z or $Z_1$ or R.

The precipitated or suspended de-solubilized dye may then be filtered and dried. Preferably the desolubilized dye is standardized (in particular by comminuting to a suitable particle-size, e.g. $\leq 50$ µm).

The synthetized reaction products may be isolated and further treated in a manner conventional per se; they may in particular be separated from the mother-liquor and preferably washed and dried and then conveniently be standardized as indicated above to a particle size suitable for their use in particular as pigments, e.g. by milling.

The milling may take place in dry form or also in the presence of a liquid carrier, e.g. in water or an organic medium, e.g. in one or more of the solvents mentioned below or/and in the presence of substrate components e.g. resin components, oils or solvents, as conventional for printing inks or pastes or in paints, and/or in plastic substrates, to give e.g. a pigment-containing master batch.

For use the pigments of the invention may advantageously be formulated to pigment-containing compositions, principally to pigment-containing master-batches or lacquer, ink or paste formulations, or may even be directly incorporated into plastic masses before their shaping, and a further object of the invention is represented by pigment-containing compositions comprising a pigment (P), which is a standardization product of $(S_D)$ as defined above.

By selection of the components, in particular of $(S_K)$ $(S_{K1})$ or $(S_{K2})$ and $(D_A)$, the properties of the respective pigments (P) may be influenced or/and modified in a broad range.

The pigments (P) of the invention are practically insoluble in water. Depending on the kind of ($D_A$) they may be of various solubility properties in organic solvents. If for instance ($D_A$) is a surfactant with a lipophilic hydrocarbon chain of 8 to 24 carbon atoms, preferably 12 to 20 carbon atoms, they may e.g. be soluble in alcohols and solvent ketones (acetone, methylethylketone).

When used in printing inks for the printing of paper (in particular newsprints) the printed paper may easily be de-inked by usual de-inking methods as are conventional in paper-recycling, and may also be subjected to a bleaching treatment, in particular by means of hypochlorite (mainly sodium or calcium hypochlorite) under conditions as conventional for the hypochlorite bleach in paper-recycling, by which, depending on the degree of hypochlorite-bleacheability, a correspondingly bleached recycled paper may be obtained.

The pigments (P) of the invention may be used in general in any field of technique in which pigments are employed, in particular for the dyeing respectively pigmenting of natural, modified or synthetic substrates in the mass, in particular in solvent-containing or essentially solvent-free plastics masses (e.g. for pigmenting polyethylene, polypropylene, polystyrene, polyvinylchloride, synthetic rubbers or rubber surrogates or synthetic leather), of modified natural substrates (e.g. for the dyeing of viscose or cellulose acetates in the spinning mass or for the pigmentation of modified caoutchouc), of natural substrates (e.g. caoutchouc), in synthetic resins (e.g. in paints on oily or aqueous basis or in lacquers of various kinds) or further in printing compositions for the graphic industry (printing pastes or printing inks), for pigment printing, for the coating of textile material or leather or for the dyeing of paper in the mass.

The pigments (P) of the invention confer to the treated substrate a colour corresponding to the colour of ($S_K$), ($S_{K1}$) or ($S_{K2}$) or—if ($D_A$) is a dye—a colour corresponding to the combination of the colours of ($S_K$) resp. ($S_{K1}$) or ($S_{K2}$) and ($D_A$), or a similar shade, of notable fastnesses, in particular light-fastness (especially the black pigments), fastness to washing, fastness to perborate, fastness to rubbing, fastness to varnishing, fastness to overdyeing, fastness to solvents and stability to migration and heat-treatment. Particularly worth mention are the pigments of darker shades, principally black, dark red, brown, blue and dark green pigments, among which in particular the inventive derivatives of C.I. Sulphur Black 1 and 2 are worth mention, which are usable as substitutes for or additives to carbon black (in particular lamp black), e.g. for car tires, pneumatic tires and rubber soles, in printing inks, e.g. for the printing of newspapers and books, in base-coats (adhesive coats) and/or in pre-top coats (intermediate coats) for leather and synthetic leather, and in adhesive compositions for rubber profiles. In view of the hypochlorite-bleachability of the recycled paper pulp in resp. upon de-inking, they are particularly suitable for the formulation of printing inks. Such printing inks, which are characterized by a content of a pigment (P) as defined above, may contain printing ink formulation components as conventional per se for printing inks, in particular solvents, resins and/or oils, and optionally further components as suitable for the selected use, e.g. letterpress, lithograph, dry offset, flexograph or rotogravure printing inks, of which particularly the newsprint inks are to be emphasized. The (P)-content in the ink formulations may vary broadly, depending in particular on the ink formulation and use,
principally in the range of 1 to 50%, in particular 2 to 30%, based on the weight of the ink. They may also be used as toners in conventional printing inks.

In the following Examples parts and percentages are by weight, the temperatures are in degrees Celsius. "C.I." stands for "Colour Index". In the Application Examples the percentages refer to the weight of the substrate, if not otherwise indicated; the employed products other than the dyes of the invention are commercially available products or are synthetized by known methods.

EXAMPLE 1

16.6 parts of trimethylamine-hydrochloride (98% grade) are placed in a four-necked flask equipped with stirrer, thermometer and dropping funnel, together with 12.5 parts of water at 19° C. 16.0 parts of epichlorohydrin (98% grade) are added to the solution over 10 minutes. After an initial mixing time the reaction starts to become exothermic and the temperature is maintained at 30° C. with external cooling during 30 minutes. The obtained (3-chloro-2-hydroxypropyl-1)-trimethylammonium chloride may be employed in the obtained diluted form in the further reactions or may also be dried, if desired.

EXAMPLE 2a 150 parts of a 25% solution of C.I. Leuco Sulphur Black 1 [obtained by dissolving the press-cake produced according to part a) of Example 1 of GB-A-2 255 981 by addition of ⅓ of its weight of a 50% NaOH solution and diluting with water] are placed in a four-necked flask, equipped with mechanical stirrer, pH-meter, dropping funnel and thermometer. The pH is 12.9 and the temperature 20° C. 57.58 parts of (3-chloro-2-hydroxypropyl-1)-trimethylammonium chloride (of 98% strength) are added over 5 minutes and 100 parts of water are added in order to maintain the mixture stirrable. The reaction is exothermic and the temperature is allowed to raise to 40° C. while the pH decreases to 10.8. After 10 minutes, when the pH has reached 7.0, 8.1 parts of 30% hydrochloric acid are added and the reaction is allowed to complete at room temperature for 3 hours. Then 12.7 further parts of 30% hydrochloric acid are added, by which the pH drops to 3, and the obtained mixture is purified and concentrated by membrane filtration through a membrane giving a cut-off at a molecular weight of 9000 d (referred to polyethyleneglycol). There are obtained 158.5 parts of liquid concentrated dye composition.

EXAMPLE 2b

Example 2a is repeated, with the difference that the starting press-cake is the filtration residue of the precipitate obtained by sulphuric acid addition at pH 6.5, instead of the precipitate obtained by aeration.

EXAMPLE 3

The procedure described in Example 2a or 2b is repeated, with the difference that, upon the acidification of the reaction mixture to pH 3, this mixture is poured into 1000 parts of 100% ethanol by which the obtained dye precipitates. It is then filtered and dried under vacuum at 60° C. There are obtained 89.6 parts of solid dye which—assuming that the starting C.I. Leuco Sulphur Black 1 would correspond to the above postulated formula ($a_1$), in sodium salt form—may be represented by the following presumed formula

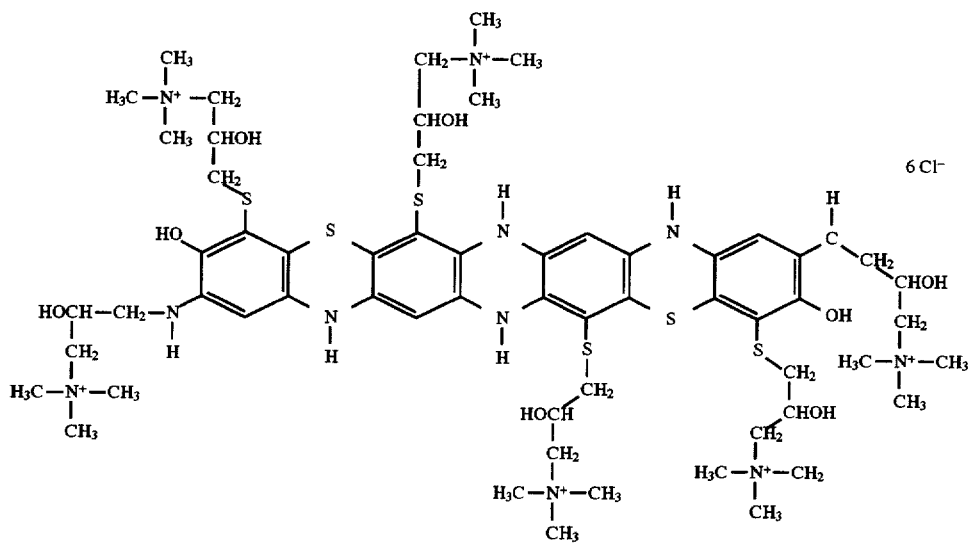

The ethanolic solution is recovered by distillation under vacuum and as a residue there are obtained 41.3 parts of a brilliant blue dye (extinction coefficient=4.5 in dimethylformamide/water).

EXAMPLE 4

The procedure described in Example 2a or 2b is repeated with the difference that instead of the employed quantity of (3-chloro-2-hydroxypropyl-1)-trimethylammonium chloride, there is employed the equivalent amount of an equimolar mixture of (3-chloro-2-hydroxypropyl-1)-trimethylammonium chloride and chloracetamide.

EXAMPLE 5

The process described in Example 4 is repeated with the difference that, instead of (3-chloro-2-hydroxypropyl-1)-trimethylammonium chloride, there is employed the equivalent amount of β-(dimethylamino)-ethyl chloride.

EXAMPLE 6

150 parts of a 25% solution of C.I. Leuco Sulphur Black 1 as employed in Example 2a or 2b are placed in a four-necked flask, equipped with mechanical stirrer, pH-meter, dropping funnel and thermometer. The pH is 12.9 and the temperature 20° C. 74.2 parts of dimethylaminoethylchloride hydrochloride are added in 30 minutes to the previous solution, keeping the pH at 9 by the addition of 20 parts of aqueous 25% sodium hydroxide solution. The reaction is slightly exothermic and the temperature is allowed to increase to 30° C. Then the temperature is raised to 60° C. keeping the pH at 9 by the addition of aqueous 25% sodium hydroxide solution. When the temperature reaches 60° C., the pH is stable. The solution is then allowed to cool. When the temperature has decreased to 25° C., 47.7 parts of chloracetamide are added. After 4 hours reacting, the pH is adjusted to 5 by the addition of aqueous 30% hydrochloric acid solution. There are obtained 330 parts of black dyestuff solution.

EXAMPLE 7

The procedure described in Example 2a or 2b is repeated, with the difference that, instead of (3-chloro-2-hydroxypropyl-1)-trimethylammonium chloride there is employed the equivalent amount of β-(dimethylamino)-ethyl chloride. Assuming that the starting C.I. Leuco Sulphur Black 1 would correspond to the above postulated formula $(a_1)$, in sodium salt form, the obtained dye may be represented by the presumed formula

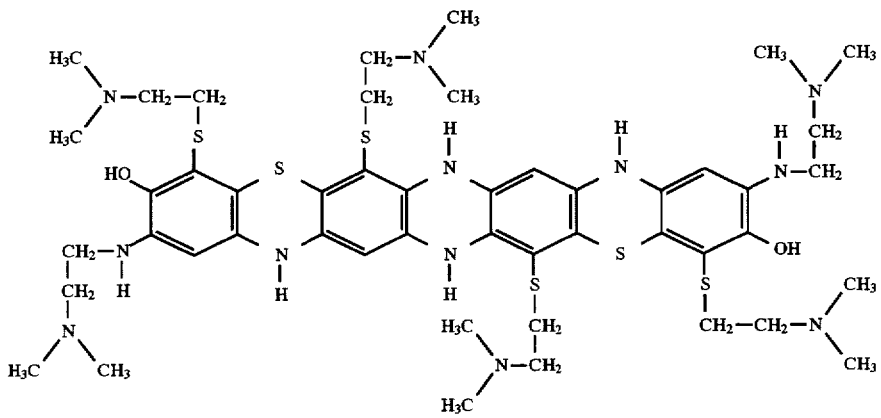

and is obtained in the protonated form of its hydrochloric acid adduct.

EXAMPLE 8

150 parts of a 25% solution of C.I. Leuco Sulphur Black 1 as employed in Example 2a are placed in a four-necked flask, equipped with mechanical stirrer, pH-meter, dropping funnel and thermometer. The pH is 12.9 and the temperature 20° C. The solution is heated to 70° C and then 74.2 parts of β-(dimethylamino)-ethylchloride hydrochloride are added in 30 minutes to the previous solution, keeping the pH at 8 by addition of 45 parts of aqueous 25% sodium hydroxide solution. The reaction is slightly exothermic and the temperature raises to 75° C. After two hours at pH 8 and of a temperature of 70° C., the pH is adjusted to 10 by the addition of 14 parts of aqueous 30% sodium hydroxide solution and the reaction mass is stirred for 2 hours, keeping the pH at 10 by addition of 8 parts of aqueous 30% sodium hydroxide solution. The next day, the pH is adjusted to 7 by the addition of 15 parts of glacial acetic acid. There are obtained 306 parts of a black dyestuff solution.

EXAMPLE 9

The procedure described in Example 2b is repeated, with the difference that, instead of the there employed quantity of the 25% solution of C.I. Leuco Sulphur Black 1, there is employed the equivalent amount of a mixture of equimolar proportions of the 25% solution of C.I. Leuco Sulphur Black 1 and a 6.75% solution of C.I. Leuco Sulphur Brown 10 [produced by dissolving the press-cake obtained according to part a) of Example 6 of GB-A-2 255 981 with 6% of its weight of 50% NaOH solution and dilution with water]. There is obtained a black/brown mixture of cationic dyes.

EXAMPLE 10

The procedure described in Example 2a or 2b is repeated, with the difference that instead of the employed quantity of (3-chloro-2-hydroxypropyl-1)-trimethylammonium chloride there is employed the equivalent amount of a mixture of (3-chloro-2-hydroxypropyl-1)-trimethylammonium chloride and chloracetamide in the molar ratio of 2:1. Assuming that the starting C.I. Leuco Sulphur Black 1 would correspond to the above postulated formula $(a_1)$, in sodium salt form, the obtained dye may be represented by the following presumed formula

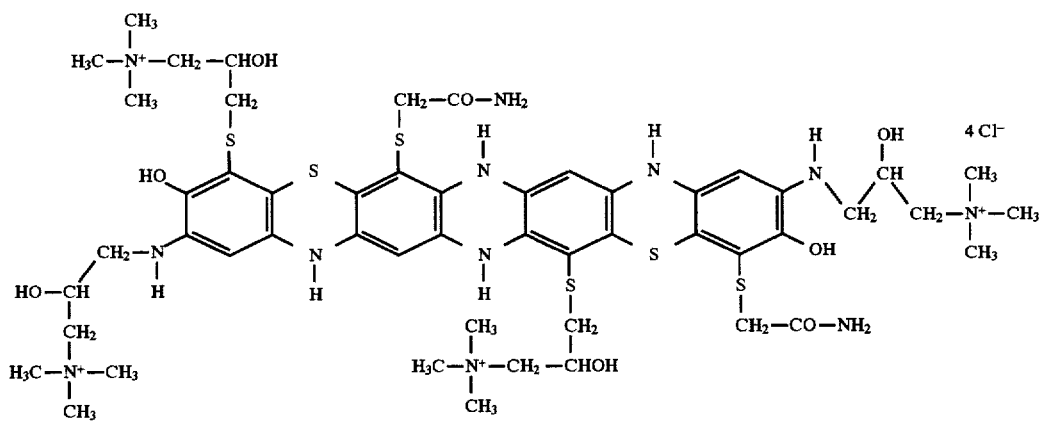

EXAMPLE 11

Example 1 is repeated, with the difference that instead of trimethylamine hydrochloride there is employed the equivalent amount of 1-chloro-2-dimethylamino-ethane hydrochloride and instead of epichlorohydrin there is employed the equivalent amount of chloracetamide. The obtained (2-chloro-ethyl-1)-N-carbamoylmethyl-N,N-dimethylammonium chloride may be employed in the obtained diluted form in the further reactions or may be dried.

EXAMPLE 12

The procedure described in Example 2a or 2b is repeated, with the difference that instead of the (3-chloro-2-hydroxypropyl-1)-trimethylammonium there is employed the product of Example 11 in the molar ratio of 7:1 to the C.I. Leuco Sulphur Black 1. Assuming that the starting C.I. Leuco Sulphur Black 1 would correspond to the above postulated formula (a₁), in sodium salt form, the obtained dye may be represented by the presumed formula ($a_2$) in which t=2, the obtained dye may be represented by the following presumed formula

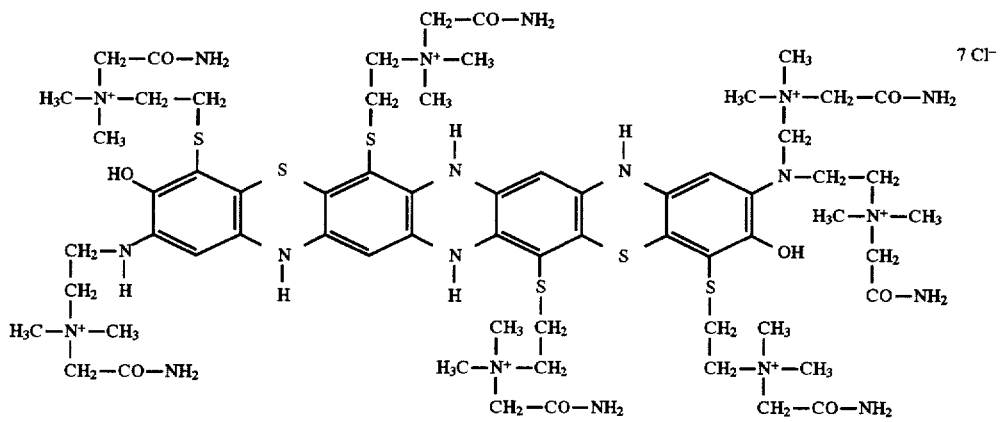

EXAMPLE 13

The procedure described in Example 2a or 2b is repeated, with the difference that instead of the 25% solution of C.I. Leuco Sulphur Black 1 there is employed the equivalent amount of a 6.75% solution of C.I. Leuco Sulphur Brown 10 (produced as described in the above Example 9) and that the (3-chloro-2-hydroxypropyl-1)-trimethylammonium chloride of Example 1 is employed in the molar ratio of 10:1 to the C.I. Leuco Sulphur Brown 10. Assuming that C.I. Leuco Sulphur Brown 10 would be a tetramer of the above formula

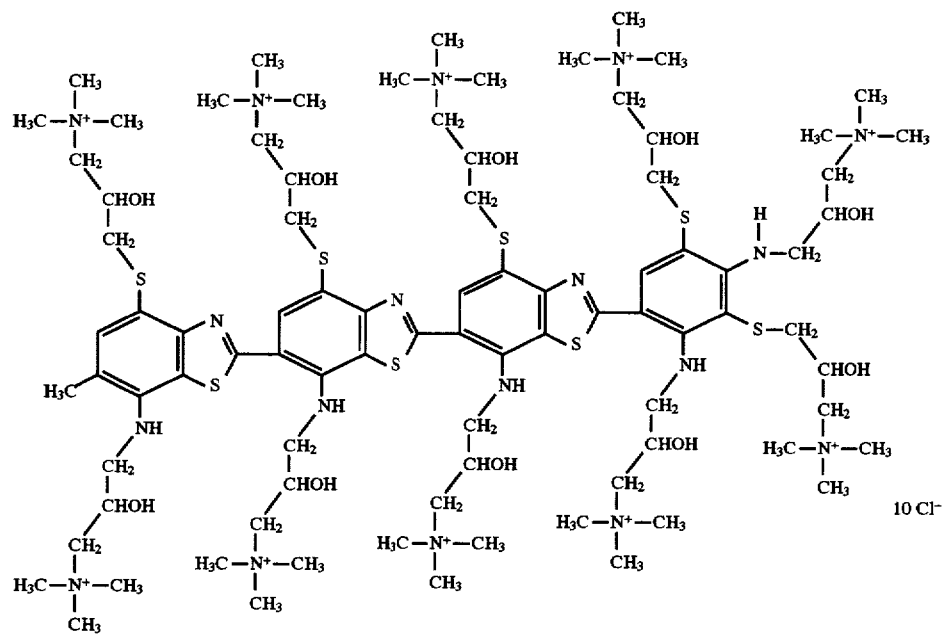

EXAMPLE 14

Example 13 is repeated with the difference that instead of 10 mols of(3-chloro-2-hydroxypropyl-1)-trimethylammonium chloride there are employed 9 mols thereof per mol of C.I. Leuco Sulphur Brown 10.

EXAMPLE 15

Example 13 is repeated with the difference that instead of 10 mols of (3-chloro-2-hydroxypropyl-1)-trimethylammonium chloride there are employed 12 mols thereof per mol of C.I. Leuco Sulphur Brown 10.

EXAMPLE 16

Example 13 is repeated with the difference that instead of C.I. Leuco Sulphur Brown 10 there is employed the equivalent amount of a mixture of C.I. Leuco Sulphur Black 1 and of C.I. Leuco Sulphur Brown 10, and that the N-(3-chloro-2-hydroxypropyl-1)-trimethylammonium chloride is employed in a molar ratio of 8 mols thereof per 1 mol of C.I. Leuco Sulphur Black 1 and 0.15 mols of C.I. Leuco Sulphur Brown 10.

EXAMPLE 17

Example 2a is repeated, with the difference that instead of 6 mols of (3-chloro-2-hydroxypropyl-1)-trimethylammonium chloride there are employed 4 mols thereof per mol of C.I. Leuco Sulphur Black 1.

EXAMPLE 18

Example 2a is repeated, with the difference that instead of 6 mols of (3-chloro-2-hydroxypropyl-1)-trimethylammonium chloride there are employed 5 mols thereof per mol of C.I. Leuco Sulphur Black 1.

EXAMPLE 19

Example 2a is repeated, with the difference that instead of 6 mols of (3-chloro-2-hydroxypropyl-1)-trimethylammonium chloride there are employed 8 mols thereof per mol of C.I. Leuco Sulphur Black 1.

EXAMPLE 20

Example 2a is repeated, with the difference that instead of 6 mols of (3-chloro-2-hydroxypropyl-1)-trimethylammonium chloride there are employed 9 mols thereof per mol of C.I. Leuco Sulphur Black 1.

EXAMPLE 21

Example 2a is repeated, with the difference that instead of 6 mols of (3-chloro-2-hydroxypropyl-1)-trimethylammonium chloride there are employed 10 mols thereof per mol of C.I. Leuco Sulphur Black 1.

EXAMPLE 22

Example 2a is repeated, with the difference that instead of 6 mols of (3-chloro-2-hydroxypropyl-1)-trimethylammonium chloride there are employed 12 mols thereof per mol of C.I. Leuco Sulphur Black 1.

EXAMPLE 23

104 parts of a 2.5% solution of C.I. Leuco Sulphur Blue 7 [produced by dissolving the filter cake obtained as described in the first part of Example 5 of GB-A-2 201 165—i.e. by filtration of the aerated slurry of the thionation mass—by addition of 10% of its weight of a 50% NaOH solution and dilution with water] are placed in a four-necked flask, equipped with mechanical stirrer, pH-meter, dropping funnel and thermometer. The pH is 13.3 and the temperature 20° C. 38.4 parts of N-(3-chloro-2-hydroxypropyl-1)-N,N,N-trimethylammonium chloride (of 98% strength) are added in five minutes to the previous solution, by which the pH drops to 9.2. The reaction is slightly exothermic and the temperature raises to 32° C. After 30 minutes the temperature is increased to 60° C., while allowing the pH to decrease. When the pH is stable, the heating is switched off and the reaction mass is stirred over night. The pH is adjusted to 3 by the addition of 3 parts of hydrochloric acid 30% aqueous solution. There are obtained 145 parts of a blue dyestuff solution.

EXAMPLE 24

200 parts of a 6.75% solution of C.I. Leuco Sulphur Brown 10 [produced as indicated in the above Example 9] are placed in a four-necked flask, equipped with mechanical stirrer, pH-meter, dropping funnel and thermometer. The pH is 12.0 and the temperature 20° C. 52.8 parts of N-(3-chloro-2-hydroxypropyl-1)-N,N,N-trimethylammonium chloride (of 98% strength) are added in five minutes to the previous solution, while the pH is allowed to drop to 12.0. The reaction is slightly exothermic and the temperature raises to 40° C. The reaction mass is stirred overnight. The pH is adjusted to 3 by the addition of 11 parts of aqueous 30% hydrochloric acid solution. There are obtained 264 parts of a brown dyestuff solution.

EXAMPLE 25

200 parts of a 4% solution of C.I. Leuco Sulphur Yellow 22 [produced by dissolving the filter cake obtained as described in the first full paragraph of Example 3 of GB-A-2 201 165 with ⅙ of its weight of a 50% NaOH solution and dilution with water] are placed in a four-necked flask, equipped with mechanical stirrer, pH-meter, dropping funnel and thermometer. The pH is 12.0 and the temperature 20° C. 52.8 parts of N-(3-chloro-2-hydroxypropyl-1)-N,N,N-trimethylammonium chloride (of 98% strength) are added in five minutes to the previous solution, by which the pH decreases to 12.0. The reaction is slightly exothermic and the temperature raises to 40° C. The pH is adjusted to 7.0 by the addition of 9 parts of aqueous 30% hydrochloric acid solution and the reaction mass is stirred over night. Then the pH is adjusted to 3 by the addition of 11 parts of aqueous 25% hydrochloric acid solution. There are obtained 273 parts of a yellow dyestuff solution.

EXAMPLE 26

75 parts of a 25% solution of C.I. Leuco Sulphur Black 1 as employed in Example 2a or 2b and 37.8 parts of a 6.75% solution of C.I. Leuco Sulphur Brown 10 as employed in Example 9 are placed in a four-necked flask, equipped with mechanical stirrer, pH-meter, dropping funnel and thermometer. The pH is 12.0 and the temperature 20° C. 46 parts of N-(3-chloro-2-hydroxypropyl-1)-N,N,N-trimethylammonium chloride (of 98% strength) are added over five minutes into the previous solution, while the pH drops to 9.7. The reaction is slightly exothermic and the temperature raises to 40° C. The pH is adjusted to 7.0 by the addition of 4 parts of an aqueous 30% hydrochloric acid solution and the reaction mass is stirred overnight. The pH is adjusted to 3 by the addition of 6 parts of an aqueous 30% hydrochloric acid solution. There are obtained 168 parts of a black dyestuff solution.

EXAMPLE 27

39 parts of a 25% solution of C.I. Leuco Sulphur Black 1 as employed in Example 2 or 2bis are heated to 60° C. and 16 parts of N-(2-chloroethyl)-N,N,N-trimethylammonium chloride are added thereto during 1 hour with stirring. Stirring is continued for 15 minutes at 75°–80° C., then the pH is lowered to 8 by addition of 1 part of 30% hydrochloric acid and the mixture is heated to 95° C. for 1 hour. Then it is cooled to ambient temperature and the pH is adjusted to 3 by addition of 2 parts of 30% hydrochloric acid. There is obtained a solution of the cationic black dye.

EXAMPLE 28

80 parts of 2,4-dinitrochlorobenzene are reacted with the equivalent amount of sodium hydroxide to obtain the sodium phenolate. This product is reacted with a mixture of 83 parts of sodium sulphide and 58 parts of sulphur at 115° C. during 10–15 hours. The product is precipitated by air-oxidation, filtered and washed. There are obtained 200 parts of a product in oxidized form, as a paste. This product is poured into a solution of 20 parts of sodium carbonate in 140 parts of water and the obtained mixture is reacted with 113 parts of N-(3-chloro-2-hydroxypropyl-1)-N,N,N-trimethylammonium chloride during 1 hour at 50° C. The obtained product, which is a cationic modification of C.I Sulphur Black 1, is directly usable as dye. If desired it may be purified by ultrafiltration.

EXAMPLE 29

The procedure described in Example 28 is repeated with the difference that instead of 113 parts of N-(3-chloro-2-hydroxypropyl-1)-N,N,N-trimethylammonium chloride there are used 150 parts thereof.

EXAMPLE 30

The procedure described in Example 28 is repeated with the difference that instead of the thionation mixture of the synthesis of C.I. Sulphur Black 1 there is employed the corresponding amount of the reaction mixture obtained from the synthesis of C.I. Sulphur Brown 10.

EXAMPLE 31

The procedure described in Example 28 is repeated with the difference that instead of the thionation mixture of the synthesis of C.I Sulphur Black 1 there is employed the corresponding amount of the reaction mixture obtained from the synthesis of C.I. Sulphur Blue 13.

EXAMPLE 32

The procedure described in Example 28 is repeated with the difference that instead of the thionation mixture of the synthesis of C.I Sulphur Black 1 there is employed the corresponding amount of the reaction mixture obtained from the synthesis of C.I. Sulphur Yellow 22.

Analogously as the solutions of C.I. Leuco Sulphur Black 1, Brown 10, Blue 7 or 13 and Yellow 22, there are employed in the above Examples 2 to 10 and 12 to 27 equivalent amounts of solutions of C.I. Leuco Sulphur Black 1, Brown 10, Blue 7 or 13 and Yellow 22, in reduced form as described in the Examples of GB-A-2 2 255 981 or 2 201 165.

Application Example A

Crust split leather of 2.2 mm thickness is wetted with 500% water at 55° C and 1% ammonia of 25% strength and 1% wetting agent during 1 hour. The pH of the leather's cut is 5.2. The bath is drained off. Then the leather is dyed with 500% water at 50° C., 1% ammonia of 25% strength, 5% of a commercial anionic dye (e.g. C.I. Solubilized Sulphur Black 1) added in powder form in 2 steps at 15 min. interval. After 15 minutes, 2.5% formic acid of 85% strength is added. Then the leather is dyed with 500% water at 50° C., 2% cationic dyestuff of the same shade (e.g. the cationic black dye of Example 2a, 2b or 3 above) and 0.4% of formic acid of 85% strength during 30 minutes. The leather is then washed with 300% of water at 50° C., during 5 minutes. The split is overdyed with 400% water at 60° C., 5% of the same anionic dye (e.g. C.I. Solubilized Sulphur Black 1) during 30 minutes and treated with 2% vaseline oil for 30 minutes and then with 4% formic acid of 85% strength (added in two additions at 10 minutes interval) during 1 hour. The leather is washed with 300% water at 50° C. during 5 minutes, drained off, dried and cured as usual. The treated split leather is fully penetrated and the surface dyed in a deep black with good fastness.

Application Example B

Chrome-tanned cow leather of 2.2 mm thickness, the pH of which is adjusted to 4.5 to 5.5 with sodium formate and sodium bicarbonate, is retanned in a fresh bath at 25° C. with 150% of water, 4% of polymethacrylate retanning agent, 3% of mimosa extract and 1% of a polycondensate of formaldehyde with β-naphthalene sulphonic acid (molar ratio ¾). After 40 minutes of drum rotation the bath is drained off and the leather is pre-dyed in a fresh bath with 150% of water and 2% of C.I. Solubilized Sulphur Black 1 during 30 minutes; to this bath are then added 10.5% of fat liquor (7.5% of sulphited fish-oil, 2.5% of sulphated coconut oil and 0.5% of neat's foot oil); after further 90 minutes 1% of 85% formic acid is added and drumming is continued for 30 minutes. Then the bath is drained off and the leather is washed with 150% of water at 35° C. Then the leather is dyed at 50° C. in a fresh bath with 150% of water, 1% of formic acid of 85% strength and 2% of the cationized black dye of Example 2a, 2b or 3 during 60 minutes. Then 1% of sodium carbonate is added and after 30 minutes the bath is drained off and the leather is washed with 300% of water at 50° C. during 5 minutes, drained, dried and cured as usual. The treated leather is optimally penetration-dyed and surface-dyed in black in a high yield and the dyeing is of optimum fastenesses.

Application Example C

Chrome-tanned cow leather of 2.2 mm thickness, the pH of which is adjusted to 4.5 to 5.5 with sodium formate and sodium bicarbonate, is retanned in a fresh bath at 25° C. with 150% of water, 4% of polymethacrylate retanning agent, 3% of mimosa extract and 1% of a polycondensate of formaldehyde with β-naphthalene sulphonic acid (molar ratio ¾). After 40 minutes of drum rotation the bath is drained off and the leather is fat-liquored with 10.5% of fat liquor (7.5% of sulphited fish-oil, 2.5% of sulphated coconut oil and 0.5% of neat's foot oil) during 90 minutes, after which 1% of 85% formic acid is added and drumming is continued for 30 minutes. Then the bath is drained off and the leather is washed with 150% of water at 35° C. Then the leather is dyed at 60° C. in a fresh bath with 150% of water, 1% of formic acid of 85% strength and 4% of the cationized black dye of Example 2a, 2b or 3 during 60 minutes then the pH is adjusted to 4.5 with sodium carbonate and after 30 minutes the bath is drained off and the leather is washed with 300% of water at 50° C. during 5 minutes, drained, dried and cured as usual. The treated leather is optimally penetration-dyed and surface-dyed in black in a high yield and the dyeing is of optimum fastenesses.

Application Example D

The procedure described in Application Example C is repeated, with the difference that, before the conclusive washing with the 300% of water at 50° C., the leather is dyed in a fresh bath with 150% of water and 2% of C.I. Solubilized Sulphur Black 1 during 30 minutes at 60° C.; then 2% of 85% formic acid is added in 3 additions at 10 minutes intervals and then the leather is washed with 300% of water at 50° C. during 5 minutes, drained, dried and cured as usual. The treated leather is optimally penetration-dyed and surface-dyed in black in a high yield and the dyeing is of optimum fastenesses.

Application Example E

The leather dyed according to Application Example C is spray-dyed with an aqueous sprayable dye composition containing 50 parts of the cationic black dye of Example 2a or 2b,
150 parts of a mixture of
   18 parts of carboxymethylated oleyl-poly(10)-ethyleneglycolether sodium salt,
   450 parts of butylpolyglycol,
   40 parts of etyleneglycol,
   60 parts of ethylglycol
and
   800 parts of water
by one spray application, and is then finished as desired. There is obtained a good, deep black of high fastnesses.

Instead of the leather dyed according to Application Example C there may also be employed as a substrate for the spray-dyeing a grain leather that has otherwise been dyed in black, e.g. with an anionic dye, as the C.I. Solubilized Sulphur Black 1 in the pre-dyeing described in Application Example B.

Application Example F 70 parts of chemically bleached sulphite cellulose of pinewood and 30 parts of chemically bleached sulphite cellulose of birchwood are ground in a hollander in 2000 parts of water. 0.3 part of the black dyestuff of Example 2a, 2b or 3 are sprinkled into this mass. After mixing for 20 minutes, paper is produced therefrom. The paper thus obtained is dyed black of notable light fastness and wet fastness.

Application Example G 0.3 of the black dyestuff powder of Example 2a, 2b or 3 is dissolved in 100 parts of hot water and cooled to room temperature. The solution is added to 100 parts of unbleached mechanical pulp which have been ground in a hollander in 2000 parts of water. After thorough mixing for 15 minutes, sizing takes place in the usual way with rosin size and aluminium sulphate. Paper which is produced from this material is dyed black and exhibits good light- and wet fastness.

Application Example H

An unsized absorbtive paper web is drawn through a dyestuff solution of the following composition at 40°–50° C.:

3 parts of the liquid dye preparation according to Example 2a or 2b,
0.5 parts of starch, and
96.5 parts of water.

The excess dye liquor is squeezed out through two rollers. The dried sized paper web is dyed black.

Analogously as the dye of Examples 2a or 2b the dyes obtained in each of the other Examples 4 to 10 and 12 to 32 or mixtures thereof are used in equivalent amounts in each of Application Examples A to H.

Analogously as the black, brown, yellow or blue dyes used as starting dyes in the above Examples 2 to 10 and 12 to 27, the other dyes described in the Examples of GB-A-2 201 165, 2 255 981 and 2 273 103 are employed as starting products in the above synthetic Examples, by which there are obtained corresponding cationic dyes, which are usable in the Application Examples A to H above, yielding leather-dyeings of corresponding shades.

Pigment Example 1

The liquid dye solution obtained according to Example 2a or 2b is mixed with a 25% solution of C.I. Solubilized Sulphur Black 1 in the molar ratio of 2:3 and the mixture is heated to the boil with stirring during 2 hours. The suspension is cooled to 40° C. and the precipitated dye is filtered, washed and ground in a ball mill to a particle size of 2–10 μm. There is obtained a black pigment.

Pigment Example 2

The liquid dye solution obtained according to Example 2a or 2b is mixed at 30° C. and pH 7 with a molar solution of sodium stearate at a molar ratio of 1:6 and the mixture is stirred for 2 hours. The suspension is cooled to 20° C. and the precipitated dye is filtered, washed and ground in a ball mill to a particle size of 2–10 μm. There is obtained a black pigment. A 7% solution of this pigment in ethanol of 96% strength may be used as jet-ink.

Pigment Example 3

The liquid dye solution obtained according to Example 2a or 2b is mixed at 30° C. and pH 7 with a molar solution of sodium stearate at a molar ratio of 1:9 and the mixture is stirred for 2 hours. The suspension is cooled to 20° C. and the precipitated dye is filtered, washed and ground in a ball mill to a particle size of 2–10 μm. There is obtained a black pigment. This pigment may e.g. be used in aqueous pigmented leather finishes.

We claim:

1. A water-soluble cationic dye ($S_K$) comprising at least one group (G) which is a quaternary ammonium group or a protonated or protonizable tertiary amino group and at least one chromophoric radical (D), wherein the chromophoric radical (D) is the radical of an optionally (pre)reduced sulphur dye, or a mixture thereof.

2. The cationic dye ($S_K$) or mixture thereof according to claim 1, further containing an anionic or a non-ionic hydrophilic substituent.

3. The cationic dye ($S_K$) or mixture thereof according to claim 1 of the general formula $$[R-X_1]_{\overline{m}}D+X_1-Y-Z_2]_{(q-m)}, \quad (VI)$$

wherein R is a non-ionogenic radical, $X_1$ signifies S—O—, —NH—,

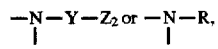

Y signifies an aliphatic or araliphatic bridging group, $Z_2$ signifies a tertiary amino group of basic character which may be protonated or a quaternary ammonium group, D signifies the q-valent chromophoric radical of an optionally (pre)reduced sulphur dye of the formula (I)

$$D+XH)_q \tag{I}$$

X signifies —S—, —NH— or —O— q signifies a figure from 1 to the maximum functionality of the optionally (pre)reduced sulphur dye of formula (I), and m is a figure in the range from 0 to (q-1), formula (I) being shown in the free acid form but may also be in the alkali metal salt form.

4. The cationic dye ($S_K$) or mixture thereof according to claim 3 of the general formula $$D+X_2-Y-Z_2)_q, \tag{VI}$$

wherein $X_2$ signifies —O—, —S—, —NH— or $$-\underset{|}{N}-Y-Z_2.$$

5. The cationic dye ($S_K$) or mixture thereof according to claim 3, wherein Y signifies —CH$_2$—CHOH—CH$_2$—.

6. The cationic dye ($S_K$) or mixture thereof according to claim 3 wherein $Z_2$ signifies a group of formula $$\begin{array}{c} R_1 \\ | \\ -N^+-R_2 \quad A^- \\ | \\ R_3 \end{array} \tag{$z_4$}$$

in which $R_1$ signifies $C_{1-4}$-alkyl, —($C_{1-4}$-alkylene)—Q—OM, —($C_{1-4}$-alkylene)—Q—NH$_2$, benzyl or sulphobenzyl, $R_2$ signifies $C_{1-4}$-alkyl or phenyl optionally substituted with a non-protogenic donor, or $R_1$ and $R_2$ together with the nitrogen to which they are linked form a heterocyclic ring, $R_3$ signifies $C_{1-4}$-alkyl, Q signifies —CO— or —SO$_2$—, M signifies hydrogen or a cation, or $R_1$, $R_2$ and $R_3$ together with the nitrogen to which they are linked form a pyridinium group, and $A^-$ signifies a counterion to the ammonium cation.

7. A process for producing a water-soluble cationic dye ($S_K$) or mixture thereof according to claim 1 which comprises reacting (A) at least one reactive optionally (pre)reduced sulfur dye, which contains an —OH, —NH$_2$ or —SH group or any combination thereof and which may be in alkali metal salt form, with (B) at least one reactant comprising at least one amino group of basic character or ammonium group linked to a bridging member, which bridging member is further linked to a reactive substituent or contains a reactive group that is capable of reacting with the respective hydroxy, amino or thiol group of (A), so as to link the bridging member covalently to the structure of (A), and, if required, (1) alkylating any primary or secondary amino group introduced with (B), or (2) quaternizing a tertiary amino group, or both (1) and (2).

8. The process according to claim 7, wherein (A) comprises a non-(pre)reduced sulphur dye and the reaction with (B) is carried out in concomitance with the reaction with a reducing carbonyl compound.

9. A cationic dye ($S_{K1}$) obtainable by the process of claim 7 in which (B) contains a secondary amino group that does not contain any anionic substituent.

10. A process for the dyeing of a substrate dyeable with cationic dyes, wherein the substrate is dyed with at least one dye ($S_K$) according to claim 1.

11. A process for the dyeing of a substrate dyeable with cationic dyes, wherein the substrate is dyed with at least one dye ($S_{K1}$) according to claim 9.

12. A process according to claim 10, wherein the substrate is tanned leather or paper.

13. A cationic dye ($S_K$) or mixture thereof according to claim 1 wherein at least one group (G) is linked to an aliphatic or araliphatic bridging member which is linked to the chromophoric radical (D) by means of —S—, —O— or nitrogen.

14. A cationic dye ($S_K$) or mixture thereof according to claim 3 wherein the nitrogen atom of the quaternary ammonium or tertiary amino group G is linked only to aliphatic carbon atoms.

15. A cationic dye ($S_K$) or mixture thereof according to claim 3 wherein Y is an aliphatic group containing 2 to 9 carbon atoms.

16. A cationic dye ($S_K$) or mixture thereof according to claim 15 wherein

R is $C_{1-4}$-alkyl, benzyl or —($C_{1-2}$-alkylene)—CONH$_2$ and $Z_2$ is an optionally protonated group of formula ($z_3$) or a group of formula ($z_4$)

$$-NR_1R_2 \tag{$z_3$}$$

$$\begin{array}{c} R_1 \\ | \\ -N^+-R_2A^- \\ | \\ R_3 \end{array} \tag{$z_4$}$$

in which $R_1$ signifies $C_{1-4}$-alkyl, —($C_{1-4}$-alkylene)—Q—OM, —($C_{1-4}$-alkylene)—Q—NH$_2$, benzyl or sulphobenzyl, $R_2$ signifies $C_{1-4}$-alkyl or phenyl optionally substituted with a non-protogenic donor, or $R_1$ and $R_2$ together with the nitrogen to which they are linked form a heterocyclic ring, $R_3$ signifies $C_{1-4}$-alkyl, Q signifies —CO— or —SO$_2$—, M signifies hydrogen or a cation or in formula ($z_4$) $R_1$, $R_2$ and $R_3$ together with the nitrogen atom to which they are linked form a pyridinium group, and $A^-$ signifies a counterion to the ammonium cation.

17. A cationic dye ($S_K$) or mixture thereof according to claim 16 wherein Y is ethylene-1,2 or 2-hydroxypropylene-1,3 and when $R_1$ and $R_2$ together with the nitrogen to which they are attached form a heterocyclic ring this is a pyrrolidine, piperidine, morpholine or N-methyl piperazine ring.

18. A cationic dye ($S_K$) or mixture thereof according to claim 17 wherein Y signifies —CH$_2$—CHOH—CH$_2$— and $Z_2$ signifies a group of formula ($z_4$).

33

19. A cationic dye ($S_K$) or mixture thereof according to claim 17 wherein $A^-$ is a halide ion.

20. A cationic dye ($S_K$) or mixture thereof according to claim 17 of the general formula $$D\text{---}(X_2\text{---}Y\text{---}Z_2)_q$$

wherein $X_2$ signifies —O—, —S—, —NH— or —N—Y—$Z_2$.

21. A process according to claim 7 which comprises reacting (A) with (B) and with (C) at least one reactant of the formula $$W\text{---}Y\text{---}O\text{---}R_4 \quad (IV)$$

or $$W\text{---}R_5 \quad (V)$$

wherein W signifies a reactive substituent,

Y signifies an aliphatic or araliphatic bridging member, $R_4$ signifies $C_{1-4}$-alkyl, —(C1-4-alkylene)—Q—$NH_2$, benzyl or phenyl-$SO_2NH_2$, $R_5$ signifies $C_{1-4}$-alkyl, benzyl or —($C_{1-4}$-alkylene)—Q—$NH_2$, and Q signifies —CO— or —$SO_2$—.

22. A process according to claim 21 wherein (A) comprises a non-(pre)reduced sulphur dye and the reaction with (B) or with (C) or with both is carried out in concomitance with the reaction with a reducing carbonyl compound.

23. A cationic dye ($S_{K1}$) obtainable by the process of claim 21 in which (B) contains a secondary amino group that does not contain any anionic substituent.

24. A process according to claim 7 wherein (A) is selected from the group consisting of C.I. Leuco Sulphur Blacks 1, 2, 11 and 18, C.I. Leuco Sulphur Reds 10 and 14, C.I. Leuco Sulphur Blues 3, 7, 11, 13, 15 and 20, C.I. Reduced Vat Blue 43, C.I. Leuco Sulphur Greens 2, 16, 35 and 36, C.I. Leuco Sulphur Browns 1, 3, 10, 21, 26, 31, 37, 52, 95 and 96, C.I. Leuco Sulphur Orange 1, C.I. Leuco Sulphur Yellows 9 and 22 and the corresponding non-reduced sulphur dyes.

25. A process according to claim 7 wherein (A) is a compound of formula (I)

$$D\text{---}(XH)_q \quad (I)$$

in which X signifies —O—, —S— or —NH—,

D is the q-valent chromophoric radical of the dye and q signifies a figure from 1 to the maximum functionality of the optionally (pre)reduced sulphur dye of formula (I).

26. A process according to claim 25 wherein (B) is a compound of formula (II)

$$W\text{---}Y\text{---}Z \quad (II)$$

in which

W signifies a reactive substituent selected from alkylsulphate, arylsulphate, trifluoroacetate, halide and, where Z is tertiary or quaternary, together with a substituent or bond of Y, an epoxide group, Y signifies an aliphatic bridging group which contains 2 to 9 carbon atoms, whereby W and Z are a distance of at least 2 carbon atoms from each other, and Z signifies a primary, secondary or tertiary amino group of basic character or its protonated derivative or a quaternary ammonium group or an optionally quaternized oligamine radical.

27. A process according to claim 26 wherein Z is a group ($z_1$), ($z_2$), ($z_3$) or ($z_4$)

$$—NH_2 \quad (z_1)$$

$$—NHR_1 \quad (z_2)$$

$$—NR_1R_2 \quad (z_3)$$

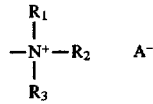
$(z_4)$ in which $R_1$ signifies $C_{1-4}$-alkyl, —($C_{1-4}$-alkylene)—Q—OM, —($C_{1-4}$-alkylene)—Q—$NH_2$, benzyl or sulphobenzyl, $R_2$ signifies $C_{1-4}$-alkyl or phenyl optionally substituted with a non-protogenic donor, or $R_1$ and $R_2$ together with the nitrogen to which they are linked form a heterocyclic ring selected from pyrrolidine, piperidine, morpholine and N-methylpiperazine, $R_3$ signifies $C_{1-4}$-alkyl, Q signifies —CO— or —$SO_2$—, M signifies hydrogen or a cation, or in formula ($z_4$) $R_1$, $R_2$ and $R_3$ together with the nitrogen atom to which they are linked form a pyridinium group, and $A^-$ signifies a counterion to the ammonium cation.

28. A process according to claim 26 wherein the compound of formula (II) is a compound of formula (II') or (II")

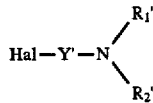
(II')

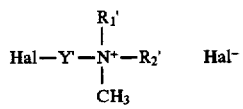
(II")

in which Y' signifies ethylene-1,2 or 2-hydroxypropylene-1,3, $R_1'$ signifies methyl, ethyl, benzyl or —$CH_2$—CO—$NH_2$, $R_2'$ signifies methyl or ethyl and Hal signifies halogen.

29. A process according to claim 7 wherein (B) is a compound of formula (II)

$$W\text{---}Y\text{---}Z \quad (II)$$

in which

W signifies a reactive substituent selected from alkylsulphate, arylsulphate, trifluoroacetate, halide and, where Z is tertiary or quaternary, together with a substituent or bond of Y, an epoxide group, Y signifies an aliphatic bridging group which contains 2 to 9 carbon atoms, whereby W and Z are a distance of at least 2 carbon atoms from each other, and Z signifies a primary, secondary or tertiary amino group of basic character or its protonated derivative or a quaternary ammonium group or an optionally quaternized oligamine radical.

30. A process according to claim 29 wherein Z is a group $(z_1)$, $(z_2)$, $(z_3)$ or $(z_4)$

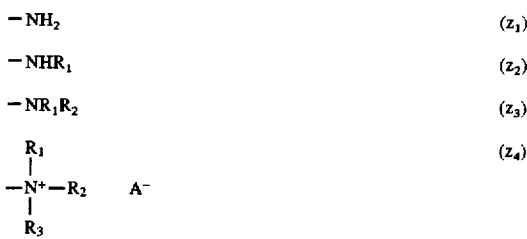

in which $R_1$ signifies $C_{1-4}$-alkyl, —($C_{1-4}$-alkylene)—Q—OM, —($C_{1-4}$-alkylene)—Q—NH$_2$, benzyl or sulphobenzyl, $R_2$ signifies $C_{1-4}$-alkyl or phenyl optionally substituted with a non-protogenic donor, or $R_1$ and $R_2$ together with the nitrogen to which they are linked form a heterocyclic ring, $R_3$ signifies $C_{1-4}$-alkyl, Q signifies —CO— or —SO$_2$—, M signifies hydrogen or a cation, or in formula $(z_4)$ $R_1$, $R_2$ and $R_3$ together with the nitrogen atom to which they are linked form a pyridinium group, and A$^-$ signifies a counterion to the ammonium cation.

31. A process according to claim 7 wherein the reaction of (A) with (B) is carried out at a temperature up to the boil.

32. A process according to claim 31 wherein the reaction of (A) with (B) is carried out at a temperature in the range 0° to 70° C.

33. A process according to claim 21 wherein W is selected from the group consisting of alkylsulphate, arylsulphate, trifluoroacetate or halogen and Y is an aliphatic group which contains 2 to 9 carbon atoms and is optionally substituted by an aliphatically bonded secondary hydroxy group or a methoxy group.

* * * * *